United States Patent Office 3,367,943
Patented Feb. 6, 1968

3,367,943
PROCESS FOR PREPARING OIL SOLUBLE ADDITIVES WHICH COMPRISES REACTING A $C_2$ TO $C_5$ ALKYLENE OXIDE WITH (a) REACTION PRODUCT OF AN ALKENYLSUCCINIC ANHYDRIDE AND AN ALIPHATIC POLYAMINE (b) REACTION PRODUCT OF ALKENYLSUCCINIC ANHYDRIDE, A $C_1$ to $C_{30}$ ALIPHATIC HYDROCARBON CARBOXYLIC ACID AND AN ALIPHATIC POLYAMINE
Harold N. Miller, Plainfield, and Joseph Versteeg, Roselle, N.J., assignors to Esso Research and Engineering Company, a corporation of Delaware
No Drawing. Filed Nov. 1, 1963, Ser. No. 320,821
4 Claims. (Cl. 260—326.3)

This invention concerns improved oil-soluble nitrogen-containing additives for hydrocarbon oil compositions of the class of fuels and lubricating oils. The additives of this invention are useful as sludge dispersants and as inhibitors of harmful deposit formation and they also possess antiwear, antioxidant and rust-inhibiting properties. The additives can be prepared by reaction of alkenyl succinic anhydrides with polyamines followed by further treatment with alkylene oxides.

Lubricants for modern high compression piston type internal combustion engines are required to have high detergency, efficient sludge dispersing action, and high oxidation resistance in order that those engines will be kept free of varnish, sludge and coke-like deposits. In other words, a heavy duty detergent type lubricating oil must be employed in such engines in order to maintain a high degree of engine cleanliness and thus promote engine life.

In the past, the majority of detergents, sludge dispersants and antioxidant materials that have been developed for use in lubricating oils for internal combustion engines have been metallic derivatives, particularly alkaline earth metal sulfonates, alkaline earth metal salts of alkyl phenol sulfides, colloidal dispersions of metallic carbonates (particularly alkaline earth metal carbonates), and the like. While in general additives of these types have proved to be quite satisfactory in their function as sludge dispersants and detergents, in many instances the ash content of these additives has presented a disadvantage in that the ash tends to accumulate in the combustion chamber of the engine and there causes pre-ignition, spark plug fouling, valve burning and similar undesirable conditions. For this reason, an effective dispersant that is ash-free is preferable over an ash-forming detergent additive such as an alkaline earth metal salt of the types mentioned above. Ash-free dispersants are also of advantage in fuel oil compositions and diesel fuels.

It has now been found, in accordance with the present invention, that effective ash-free mineral-oil-soluble detergent and dispersant additives that are also capable of serving as rust inhibitors in lubricants and fuel oils can be prepared by treating the condensation product of an alkenylsuccinic anhydride and a polyamine, or of an alkenylsuccinic anhydride, a polyamine and a carboxylic acid, with an alkylene oxide.

The preparation of reaction products of high molecular weight alkenylsuccinic anhydrides with various polyamine compounds is taught in U.S. Patents 3,024,195 and 3,024,237 and also in British Patent 922,831. The teaching in the U.S. patents referred to is that alkenylsuccinic anhydrides having alkenyl radicals derived from hydrocarbons of 400 to 3000 molecular weight can be reacted with amine derivatives of piperazine. The British patent referred to teaches that alkenylsuccinic anhydrides, as for example a polyisobutenylsuccinic anhydride, can be reacted with polyamines such as tetraethylene pentamine, diethylene triamine, triethylene tetramine, and the like.

The preparation of reaction products of alkenylsuccinic anhydrides with carboxylic acids and alkylene polyamines is disclosed and claimed in copending application Ser. No. 241,174 of Norman Tunkel et al., filed Nov. 30, 1962, now abandoned. Briefly, those reaction products are prepared by the simultaneous reaction of about 0.5 to 1.5 mole proportions of a $C_1$ to $C_{30}$ carboxylic acid, about one molar proportion of an alkylene polyamine, and about 1.0 to 1.5 molar proportions of an alkenylsuccinic anhydride wherein the alkenyl group contains in the range of from about 40 to about 250 carbon atoms, the reaction being effected by heating the reactants together until an oil-soluble product is obtained.

In the present invention, reaction products of the above types are further treated with an alkylene oxide of from 2 to 5 carbon atoms, such as ethylene oxide, propylene oxide, butylene oxide, isobutylene oxide, amylene oxide, etc. Because of the low cost and commercial availability, ethylene oxide and propylene oxide are preferred. The reaction products of the above type that are further reacted with alkylene oxides, in accordance with the present invention, are those that contain sufficient residual amino nitrogen to enable the desired reaction to take place as will be more apparent in the ensuing description.

Preparation of alkenylsuccinic anhydrides is well known in the art and simply involves the reaction of maleic anhydride with an olefinic compound, usually in equimolar proportions, although in some cases somewhat of an excess of olefinic material may be used. Generally, the reaction involves simple heating, but in other cases catalytic means may be employed. The present invention is not limited by any particular mode of preparing the alkenylsuccinic anhydride, however. The alkenylsuccinic anhydrides may be represented by the following formula:

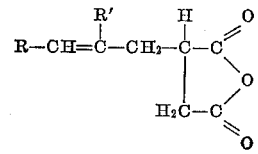

In the above formula, R and R' can be either hydrogen or hydrocarbon radicals but at least one of them must be a hydrocarbon group. For use in the present invention, it is preferred that the total number of carbon atoms in R and R' combined be within the range of from about 40 to about 250, more preferably within the range of from about 50 to about120. The hydrocarbon radicals may be either straight chain or branched chain and can be saturated at the point of low saturation by the addition of hydrogen, sulfur, chlorine, bromine or the like. The hydrocarbon radicals may be aliphatic, cycloaliphatic or aromatic. Of particular use in the present invention, because of low cost and ready availability, are alkenylsuccinic anhydrides wherein the alkenyl groups are derived from polymers of $C_2$ to $C_5$ monoolefins, such polymers having molecular weights in the range of about 300 to 3000 or more, generally in the range of from about 500 to about 1500. Particularly useful in this invention are alkenylsuccinic anhydrides prepared by reaction of maleic anhydride with polypropylene or polyisobutylene. Polymers of isobutylene having average molecular weights of, for example, 780, 940, 1200 or 1350, may be used.

The aliphatic polyamine that is employed in preparing the reaction products of the present invention may be an alkylene polyamine fitting the following general formula:

$$NH_2(CH_2)_n\text{—}[NH(CH_2)_n]_m\text{—}NH_2$$

wherein $n$ is 2 to 3 and $m$ is a number from 0 to 10. Specific compounds coming within the formula include diethylene triamine, tetraethylene pentamine, dipropylene triamine, octaethylene nonamine, and tetrapropylene pentamine. N,N-di-(2-aminoethyl)ethylene diamine may also be used. Other aliphatic polyamino compounds that may be used are N-aminoalkyl piperazines having at least two amino groups, thus providing at least one free amino group that is available for reaction with the alkylene oxide. These may be represented by the general formula:

$$NH_2\text{—}(CH_2)_n\text{—}[NH(CH_2)_n]_m\text{—}N\begin{matrix} CH_2\text{—}CH_2 \\ \diagup \qquad \diagdown \\ \diagdown \qquad \diagup \\ CH_2\text{—}CH_2 \end{matrix}N\text{—}R$$

wherein $n$ is a number 1 to 3, $m$ is a number from 0 to 6, and R is hydrogen or an aminoalkyl radical containing 1 to 3 carbon atoms. A specific example is N,N'-di-(2-aminoethyl) piperazine.

The use of mixtures of alkylene polyamines, mixtures of N-aminoalkyl piperazines, and mixtures of the alkylene polyamines with the N-aminoalkyl piperazines is also contemplated.

When preparing reaction products of the alkenylsuccinic anhydrides with the alkylene polyamines and/or the N-aminoalkyl piperazines, equimolar proportions of the alkenylsuccinic anhydride and the nitrogen-containing material are usually employed, although in some instances an excess of the anhydride or of the nitrogen compound can be used. Similarly, when preparing the reaction product of an alkenylsuccinic anhydride, a polyamine and a carboxylic acid, equimolar proportions of the three reactants are ordinarily used. However, variation in these relative proportions can be made, for example, 1.0 to 1.5 moles of the anhydride and 1.0 to 1.5 moles of the carboxylic acid can be used per mole of polyamine.

The carboxylic acid component of the reaction mixture, when such is used, comprises a carboxylic acid of from 1 to 30 carbon atoms in an aliphatic hydrocarbon chain, which can be either branched or straight chain and either saturated or unsaturated. Both monocarboxylic acids and dicarboxylic acids are included. Preferably carboxylic acids having from 1 to 18 carbon atoms are used, including acetic acid, fumaric acid, adipic acid, lauric acid, oleic acid, linoleic acid and stearic acid. Acetic acid is particularly preferred.

While the reactants, i.e., the alkenylsuccinic anhydride and the polyamino compound (and, when used, the carboxylic acid), upon simple mixing will interact to some extent, the products will generally be oil-insoluble. However, upon heating (e.g., to about 200–250° F.) the reaction mixture will become mineral-oil-soluble, and upon continued heating condensation reactions will begin to take place with the evolution of water. The evolved water can be readily removed by blowing nitrogen or other inert gas through the reaction mixture during the course of the reaction. The reaction may be carried out by heating the reactants for about 1 to 30 hours at 250 to 350° F. Preferred reaction conditions include heating for 6 to 20 hours at 275 to 300° F.

Preformed alkenylsuccinic anhydride can be used, or the alkenylsuccinic anhydride can be made by first reacting the olefinic material with the maleic anhydride to form the alkenylsuccinic anhydride, thereafter adding the polyamino compound to the hot alkenylsuccinic anhydride and then preferably further heating to form a condensation product. Similar procedures are used in the case of the 3-component reaction involving a polyamino compound, an alkenylsuccinic anhydride and a carboxylic acid. Preferably, a light mineral oil is added to the reaction mixture as a diluent after the formation of the alkenylsuccinic anhydride and before the addition of the polyamino compound or the polyamine plus fatty acid. An antifoamant agent such as a polysilicone can be added to the reaction mixture in order to prevent foaming during the addition of the amine.

For convenience, the reaction product of the alkenylsuccinic anhydride with a polyamino compound or with a polyamino compound and a carboxylic acid, as hereinbefore described, will be referred to in the ensuing description of the amine-containing intermediate. In accordance with the present invention, the amine-containing intermediate is further reacted with at least one alkylene oxide in the range of from 2 to 5 carbon atoms. As previously stated, there must be sufficient amino nitrogen remaining in the amine-containing intermediate so that reaction with the alkylene oxide may take place.

Reaction temperatures will normally range from about 200° to about 450° F., more generally in the range of 300° to 380° F., although temperatures outside these ranges are not excluded. The reaction proceeds reasonably well at atmospheric pressure but a slight positive pressure, not exceeding one additional atmosphere, may be employed to accelerate the reaction. Molar ratios of alkylene oxide to amine-containing intermediates may range from about 0.5 to 1 to a maximum of about 20 to 1, more generally from about 1 to 1 to about 8 to 1. To ensure retention of oil solubility, as a general rule the number of alkylene oxide groups added should be less than the number of methylene groups in the molecule. The reaction time will depend somewhat on the molar proportion of alkylene oxide to amine intermediate. In the case of a molar proportion of about 5 to 1, a reaction time of about 4 to 6 hours will generally suffice wheras it may require upwards of 20 to 24 hours reaction time in the case of the maximum molar ratio contemplated in this invention.

The invention will be further understood by the following examples:

*Example 1*

A reaction product was prepared by reacting 366 grams of a commercially available concentrate of a succinimide derived from polyisobutylene succinic anhydride and tetraethylene pentamine with 41 grams of ethylene oxide at 170° C. over a period of 5 hours. The ethylene oxide was fed into the reaction vessel at such a rate that a bubbler U-tube partially filled with about 10 cc. of white oil at the exit side of the reaction vessel showed no gas to be escaping. The concentrate referred to consisted of 25 wt. percent of mineral lubricating oil and 75 wt. percent of a succinimide having the formula:

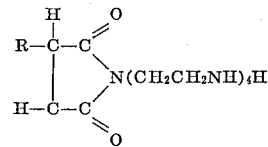

where R was a polyisobutenyl group of about 800 molecular weight. The quantity of succinimide thus used was about 0.2 mole. The quantity of ethylene oxide amounted to about 0.93 mole.

*Example 2*

A mixture of 180 pounds (0.180 pound mole) of polyisobutylene of about 800 molecular weight and 22.5 lbs. (0.230 pound mole) of maleic anhydride is heated for 24 hours at 450° F. under a nitrogen blanket to form polyisobutenylsuccinic anhydride. The product is found to have a saponification number of 86.6 mg. KOH/gm. of reaction mixture. A light mineral lubricating oil having a viscosity of 150 SUS at 100° F. is added as a diluent in sufficient quantity to result in a solution containing 75 wt. percent of the polyisobutenylsuccinic anhydride. Then 30 p.p.m. of Dow Corning 60,000 cs. polymethyl silicone is added as an antifoamant. Next, 17.22 lbs. (0.091 pound mole) of tetraethylene pentamine and 5.46 lbs. (0.091 pound mole) of acetic acid are added. The reaction mixture is then heated at 300° F. for 10–11 hours while nitrogen is blown through it until no more water evolves. The reaction product concentrate, after filtration, contains 2.22 wt. percent nitrogen based on the total product, i.e. the actual reaction product and oil diluent.

Example 3

The reaction product concentrate of Example 2 is reacted with propylene oxide in the manner of Example 1 in a molar proportion of about 4 to 1, propylene oxide to amine compound, at a reaction temperature of about 325° F. and a reaction time of about 4 hours, giving an oil-soluble reaction product.

Example 4

The rust-preventing properties of the reaction product of Example 1 were determined by dissolving 1 wt. percent of the material of Example 1 in a commercially available premium motor oil of the SAE 10–SAE 30 viscosity range. The commercial oil contained detergent inhibitors, wear inhibitors and viscosity index improving additives. The motor oil itself and the blend containing the added 1% of the material of Example 1 were each subjected to a severe test designed to predict the rusting of hydraulic valve lifters. In this test, new 1958 Oldsmobile valve lifters, which are fabricated from cast iron containing a small amount of nickel, are disassembled into body and plunger. These pieces are then degreased with solvent and permitted to dry. A very thin test oil film is formed on the test pieces by dissolving 10 grams of the test oil in 90 grams of hexane, soaking the cleaned and dried test pieces in the resulting solution for one hour and then removing the test pieces and air-drying them for 30 minutes. Then, an agar gel collar is cast over the bottom half of each of the two lifter pieces. This collar promotes corrosion by masking half of each lifter piece from oxygen available during the test. The effect of this is to set up an oxygen concentration cell. The coated test pieces are then covered with water which is aerated and held at 110° F. for 20 hours. Both the water and the agar gel collar contain $BaCl_2$ in 0.24 wt. percent concentration. At the end of the 20-hour period the test pieces are removed from the water and examined for rusting. Four sets of tests were run in this manner and the averages are given in Table I.

TABLE I

Area rusted [1], percent
Premium motor oil _____ 18
Premium motor oil+1% Example 1 product _____ 9

[1] Average of 4 tests.

It will be seen from the data that the reaction product of Example 1 improved the rust-preventing properties of the commercial oil appreciably.

Example 5

Using as the base oil a mineral lubricating oil having a viscosity of 325 SUS at 100° F. and a viscosity index of about 100, the following compositions were prepared:

| Component | Weight Percent of Ingredients | |
|---|---|---|
| | Formulation A | Formulation B |
| Example 1 Reaction Product | None | 1.44 |
| Commercial Detergent-Inhibitor | 3.50 | 3.50 |
| Zinc Diaklyl Dithiophosphate Antiwear Additive | 0.90 | 0.90 |
| Base Oil | 95.60 | 94.16 |

The commercial detergent inhibitor mentioned above is a mineral oil solution containing an additive prepared by reacting a mixture of phosphosulfurized polyisobutylene and nonyl phenol with barium hydroxide pentahydrate and blowing the reaction mixture with carbon dioxide. The approximate analysis of the concentrate is 27 wt. percent of phosphosulfurized polyisobutylene, 11.7 wt. percent nonyl phenol, 10.6 wt. percent barium oxide, 2.5 wt. percent carbon dioxide, and 48.2 wt. percent of mineral oil.

The zinc dialkyldithiophosphate antiwear additive was an oil solution concentrate consisting of about 25 wt. percent of mineral lubricating oil and about 75 wt. percent of zinc dialkyldithiophosphate prepared by treating a mixture of isobutanol and mixed amyl alcohols with $P_2S_5$ followed by neutralizing with zinc oxide.

Each of the compositions described above was tested for sludge dispersing ability in the ER 4–90 Ford sludging test. Prior experience has shown that this sludging test gives sludge deposits similar to those obtained in stop-and-go driving, such as would be experienced in taxicab operation. Briefly described, in this test a Ford 6-cylinder engine is run on a dynamometer stand through varying cycles consisting of a first cycle operating at 500 r.p.m. for 1½ hours, a second cycle operating at 2000 r.p.m. for 2 hours, and a third cycle also operating at 2000 r.p.m. for 2 hours but using slightly higher oil sump and water jacket temperatures. The three cycles are repeated over and over again in sequence until the desired total test time has elapsed. Make-up oil is added as required so that the crankcase oil level is maintained at all times between about 3½ and 4 quarts. After a selected test time has elapsed, the engine is inspected by disassembling it sufficiently to permit visual examination of the rocker arm cover, the rocker arm assembly, the cylinder head, the push rod chamber, the push rod chamber cover, the crankshaft, the oil pan, and the oil screen. The oil screen is rated as "percent covered with sludge" and the other parts are visually rated for sludge deposition using a merit system in which a numerical rating of 10 represents a perfectly clean part and 0 a part covered with the maximum amount of sludge possible. The merit ratings are averaged to give an overall engine merit rating.

The results of the preceding ER 4–90 test are given in Table II. It will be seen from these results that the reaction product of Example 1 materially improved the performance of the formulated motor oil.

TABLE II

| Hours on Test | Overall Sludge Merit Ratings | |
|---|---|---|
| | Formulation A | Formulation B |
| 61 | 9.9 | 9.9 |
| 105 | 9.3 | 9.9 |
| 149 | 9.1 | 9.8 |
| 193 | 7.5 | 9.7 |
| 237 | 6.8 | 9.7 |
| 286 | 6.7 | 9.5 |

All screen ratings were zero, except for Formulation A at 286 hours, in which case 50 percent of the oil screen was covered with sludge.

Example 6

The storage stability and rust inhibiting properties of a heating oil comprising a mineral oil distillate having a boiling range of about 360° to 660° F. and derived from mixed straight run and cracked distillates are improved by incorporating therein 0.03 wt. percent of the reaction product of Example 1.

Example 7

An additive concentrate suitable for blending into a mineral lubricating oil composition is prepared by mixing together 80 parts by weight of the reaction product of Example 1, 20 parts by weight of a commercially available synthetic high alkalinity calcium sulfonate concentrate consisting of a 46 wt. percent concentrate in mineral oil of a calcium sulfonate prepared from alkylbenzene sulfonic acids of about 420 molecular weight, containing 11.4% calcium and having a total base member of 319, and 12 parts by weight of the zinc dialkyldithiophosphate concentrate described in Example 5.

For use as lubricating oil additives the reaction products of this invention may be incorporated in lubricating oil compositions in concentration ranges of from about 0.1 to about 10 wt. percent, and will ordinarily be used in concentrations of from about 0.1 to about 5 wt. percent. The lubricating oils to which the additives of the invention may be added include not only mineral lubricating oils but synthetic oils also. The mineral lubricating oils may be of any preferred types, including those derived from the ordinary paraffinic, naphthenic, asphaltic, or mixed base mineral crude oils by suitable refining methods. Synthetic hydrocarbon lubricating oils may also be employed. Other synthetic oils include dibasic acid esters such as di-2-ethyl hexyl sebacate, carbonate esters, glycol esters such as $C_{13}$ oxo acid diesters of tetraethylene glycol, and complex esters as for example the complex ester formed by the reaction of 1 mole of sebacic acid with 2 moles of tetraethylene glycol and 2 moles of 2-ethyl haxanoic acid.

The additives of this invention may also be employed in middle distillate fuels for inhibiting corrosion and the formation of sludge and sediment in such fuels. Concentration ranges of from about 0.002 to about 2 wt. percent, or more generally from about 0.005 to about 0.2 wt. percent, are employed. Petroleum distillate fuels boiling in the range of from about 300° to about 900° F. are contemplated. Typical of such fuels are No. 1 and No. 2 fuel oils that meet ASTM Specification D–396–48T, diesel fuels qualifying as Grades 1D, 2D and 4D of ASTM Specification D–975–51T, and various jet engine fuels. Because they are ashless these additives are particularly desirable for such fuels in that they do not give rise to glowing ashes nor deter from the burning qualities of the distillates. These additives may also be used in conjunction with other prior art ashless additives for fuels, such as polymers of acrylic or methacrylic acid esters, high molecular weight aliphatic amines, etc.

The additives of this invention may also be employed, either alone or in combination with other hydrocarbon-soluble additives, in jet fuels and gasolines in concentrations ranging from about 0.001 to 1.0 weight percent as anti-icing and/or detergent and/or rust preventive additives. They may function as anti-stalling additives when added to gasolines having a tendency to cause engine stalling under cool humid weather conditions, performing this function by a combination of freezing point depressing and carburetor detergency effects. They may be employed for this purpose also in conjunction with alcohols, e.g. isopropanol, glycols, e.g. hexylene glycol, aliphatic hydroxy amines, e.g. ammomethyl propanol, and the like.

In either the fuel or lubricant compositions, other conventional additives may also be present including dyes, pour point depressants, antiwear agents, antioxidants such as phenyl-alpha-naphthylamine, tert. octylphenol sulfide, bis-phenols such as 4,4'-methylene bis (2,6-di tert. butylphenol), viscosity index improvers such as polymethacrylates, polyisobutylene, alkyl fumarate-vinyl acetate copolymers, and the like, as well as other dispersants.

The dispersant additives of the invention may be used to enhance the dispersancy-detergency of lubricants containing conventional detergents, wherein the latter are used in concentrations in the range of about 0.5 to 5 weight percent. When the conventional detergents or dispersants are metals-containing materials it is possible, by utilizing the additives of the present invention in combination therewith, to obtain added dispersancy or detergency without materially increasing the total ash-forming properties of the composition. Such metals-containing detergents or combination detergent-inhibitors include the alkaline earth metal salts of alkylated phenols or of alkylated phenol sulfides, as for example barium-calcium nonyl phenol sulfide, the so-called basic alkaline earth metal sulfonates, and dispersions of barium carbonate or calcium carbonate in mineral oils containing various surfactants such as phosphosulfurized polyolefins, for example.

The sulfonates are well known in the art and are the oil-soluble alkaline earth metal salts of high molecular weight sulfonic acids obtained by sulfonating either natural or synthetic hydrocarbons. Specific examples of suitable sulfonates include calcium petroleum sulfonate, barium petroleum sulfonate, calcium di-$C_9$ alkyl benzene sulfonate ($C_9$ group from tripropylene), and barium $C_{16}$ alkyl benzene sulfonate ($C_{16}$ group from tetraisobutylene). The sulfonates may be of either the neutral type or of the "over-based" or "high alkalinity" type, containing metal base in excess of that required for simple neutralization, wherein the excess metal base has been neutralized with carbon dioxide.

Metal salts of alkyl phenols and of the alkyl phenol sulfides are also well known in the art. Metal salts of alkyl phenols having alkyl groups of from 5 to 20 carbon atoms are usually preferred, and the metal used to form the phenate is preferably an alkaline earth metal, e.g., calcium or barium although the salts such as those of aluminum, cobalt, lead or tin are sometimes used. A specific example is the barium salt of the alkylation product of phenol with tripropylene. Metal salts of the corresponding alkyl phenol sulfides may also be used, e.g. barium tert. octyl phenol sulfide. The latter are the thioethers and polysulfides of alkyl phenols, i.e. compounds in which the alkyl groups are joined by one or more divalent sulfur atoms. The alkyl phenols can be converted to phenol sulfides by reaction with sulfur dichloride. If sulfur monochloride is used, the resulting products are primarily alkyl phenol disulfides.

Other detergent additives include the reaction products of phosphosulfurized hydrocarbons with alkaline earth metal oxides or hydroxides can be prepared by first treating a hydrocarbon with the phosphorus sulfide and then reacting the product with an alkaline earth hydroxide or oxide, for example barium hydroxide, preferably in the presence of an alkyl phenol or an alkyl phenol sulfide and also preferably in the prsence of carbon dioxide.

The dispersants of this invention may also be used in conjunction with other ashless detergents or dispersants such as high molecular weight polymeric dispersants made with one or more polar monomers, such as vinyl acetate, vinyl pyrrolidone, methacrylates, fumarates and maleates. These dispersants have molecular weights in the range of about 500 to 50,000. One example is a copolymer of 65 to 85 weight percent of mixed $C_9$–$C_{12}$ fumarates, 10 to 20 weight percent of vinyl actate, and 5 to 15 weight percent of N-vinyl pyrrolidone. Another example is the copolymer derived by reaction of mixed tallow fumarates and $C_8$ oxo fumarates, averaging about 420 molecular weight, with vinyl acetate in a 3 to 1 acetate-fumarate ratio, and 3 weight percent of maleic anhydride, followed by subsequent removal of excess vinyl acetate. By tallow fumarates is meant the esters of fumaric acid and the alcohols derived by hydrogenation of tallow. The latter are principally $C_{16}$ and $C_{18}$ alcohols with minor amounts of $C_{12}$, $C_{14}$ and $C_{20}$ alcohols. $C_8$ oxo alcohols are prepared by reaction of carbon monoxide and hydrogen on mixed $C_3$ to $C_4$ olefins followed by hydrogenation of the resulting aldehydes.

As is apparent from the foregoing examples, it is within the contemplation of this invention to prepare additive concentrates in which the concentration of additive is greater than would normally be employed in a finished lubricant. These concentrates may contain in the range of from 20 to 80% of additive on an active ingredient basis, the balance being mineral oil. Such concentrates are convenient for handling the additive in the ultimate blending operation into a finished lubricating oil composition. The additive concentrates may be made up simply of an additive of the present invention in a suitable mineral oil medium or they may include other additives that are intended for use along with the additives of the invention in a finished lubricant. Thus, if the additives are to be used in conjunction with conventional detergents, an additive concentrate can be prepared containing say 30 to 60 wt. percent of an additive of the invention and 5 to 20 wt. percent of a metal sulfonate, e.g. calcium petroleum sulfonate, or a metal alkylphenol sulfide, e.g. calcium nonylphenol sulfide, with the balance being a mineral lubricating oil. Additionally, 5 to 15 wt. percent of an antiwear agent such as a zinc dialkyldithiophosphate may also be present in the additive concentrate package.

While the lubricant compositions herein described are primarily designed as automotive crankcase lubricants, the additives of the invention may also be employed in other hydrocarbon oil compositions including turbine oils, various industrial oils, hydraulic fluids, transmission fluids and the like.

It is to be understood that the examples presented herein are intended to be merely illustrative of the invention and not as limiting it in any manner; nor is the invention to be limited by any theory regarding its operability. The scope of the invention is to be determined by the appended claims.

What is claimed is:

1. Method as defined by claim 3 wherein said alkenylsuccinic anhydride contains an alkenyl group derived from a polymer of a $C_2$ to $C_5$ monoolefin having a molecular weight in the range of from about 300 to about 3000.

2. Method as defined by claim 3 wherein said alkylene oxide is ethylene oxide.

3. A method of preparing an oil-soluble additive for mineral oil which comprises reacting, at a temperature in the range of about 200° F. to 450° F., from 0.5 to 20 molar proportions of a $C_2$ to $C_5$ alkylene oxide with about 1 mole proportion of a condensation product selected from the class consisting of
    (a) products obtained from the reaction of about 1 to 1.5 molar proportions of an alkenylsuccinic anhydride and about 1 molar proportion of an aliphatic polyamine, and
    (b) products obtained from the reaction of about 1 to 1.5 molar proportions of an alkenylsuccinic anhydride, about 0.5 to 1.5 molar proportions of a $C_1$ to $C_{30}$ aliphatic hydrocarbon carboxylic acid, and about 1 molar proportion of an aliphatic polyamine,
    said products (a) and said products (b) having been obtained under conditions evolving water of reaction,
said alkenylsuccinic anhydride having alkenyl groups totaling in the range of from about 40 to 250 carbon atoms,
said aliphatic polyamine being selected from the group consisting of polyamines of the formula $$NH_2(CH_2)_n-[NH(CH_2)_n]_m-NH_2$$

wherein $n$ is 2 to 3 and $m$ is a number from 0 to 10 and N-aminoalkylpiperazines having at least two amino groups and represented by the formula:

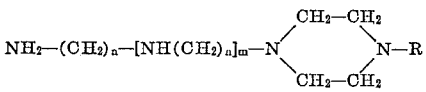

wherein $n$ is a number from 1 to 3, $m$ is a number from 0 to 6, and R is selected from the group consisting of hydrogen and aminoalkyl radicals of from 1 to 3 carbon atoms.

4. A method as defined by claim 3 wherein said aliphatic polyamine is tetraethylene pentamine.

References Cited

UNITED STATES PATENTS

| | | | |
|---|---|---|---|
| 2,373,199 | 4/1945 | Schwoegler et al. | 260—584 |
| 2,638,449 | 5/1953 | White et al. | 252—51.5 |
| 3,024,195 | 3/1962 | Drummond et al. | 252—51.5 |
| 3,037,051 | 5/1962 | Stromberg. | |
| 3,087,936 | 4/1963 | Le Suer | 252—51.5 X |
| 2,568,876 | 9/1951 | White et al. | 252—51.5 |
| 3,216,936 | 11/1965 | Le Suer | 252—51.5 X |
| 3,219,666 | 11/1965 | Norman et al. | 252—51.5 X |

FOREIGN PATENTS

| | | |
|---|---|---|
| 1,254,094 | 1/1961 | France. |
| 922,831 | 4/1963 | Great Britain. |

ALEX MAZEL, *Primary Examiner.*

DANIEL E. WYMAN, *Examiner.*

P. P. GARVIN, J. W. ADAMS, J. TOVAR,
*Assistant Examiners.*